US012704191B2

(12) United States Patent
Kilinc et al.

(10) Patent No.: US 12,704,191 B2
(45) Date of Patent: Aug. 11, 2026

(54) VALVE ASSEMBLY FOR USE IN A COOLING APPLIANCE AND COOLING APPLIANCE HAVING THE VALVE ASSEMBLY

(71) Applicant: BSH Hausgeräte GmbH, Munich (DE)

(72) Inventors: Dogan Kilinc, Istanbul (AR); Erdem Sümer, Tekirdag (AR); Eser Velisan, Muratli (AR); Necati Bora Gürel, Augsburg (DE); Veli Basarir, Tekirdag (AR); Senol Gök, Tekirdag (AR)

(73) Assignee: BSH Hausgeräte GmbH, Munich (DE)

( * ) Notice: Subject to any disclaimer, the term of this patent is extended or adjusted under 35 U.S.C. 154(b) by 216 days.

(21) Appl. No.: 18/417,385

(22) Filed: Jan. 19, 2024

(65) Prior Publication Data

US 2024/0271855 A1 Aug. 15, 2024

(51) Int. Cl.
*F16K 24/04* (2006.01)

(52) U.S. Cl.
CPC .................................... *F16K 24/04* (2013.01)

(58) Field of Classification Search
CPC ........................... F25D 21/14; F25D 2321/146
See application file for complete search history.

(56) References Cited

U.S. PATENT DOCUMENTS 1,583,051 A * 5/1926 Kennedy ................. F25D 21/14 137/602
2,201,998 A * 5/1940 Ganzer ................... F25D 21/14 137/247.33
6,293,122 B1 * 9/2001 Chang ..................... F25D 21/14 62/414
7,930,898 B2 * 4/2011 Laufenberg ........... F24F 13/222 62/291
8,229,289 B2 * 7/2012 Schneider ............. F28F 17/005 392/397
8,978,690 B2 * 3/2015 Hubbard, Sr. ............ B08B 5/02 137/557
2022/0049785 A1 2/2022 Seekings
2022/0397332 A1 * 12/2022 Chen ....................... F16K 15/16

FOREIGN PATENT DOCUMENTS

CN 201277783 Y * 7/2009 ........... F25D 17/047
CN 109764165 A 5/2019
CN 216694179 U 6/2022
DE 4032581 A1 4/1992
DE 102010017919 A1 * 10/2011 ........... F25D 17/047

OTHER PUBLICATIONS

CN 201277783 Translation (Year: 2009).*
DE 102010017919 Translation (Year: 2011).*

* cited by examiner

*Primary Examiner* — Umashankar Venkatesan
(74) *Attorney, Agent, or Firm* — Laurence A. Greenberg; Werner H. Stemer; Ralph E. Locher

(57) ABSTRACT

A valve assembly is used in a cooling appliance. The valve assembly contains a water-guiding body for draining water to the outside of the valve assembly. The water-guiding body has a longitudinal axis extending along a first end and a second end of the water-guiding body. The valve assembly further contains at least one air-guiding body coupled to the water-guiding body so as to have a free air inlet end. The air-guiding body is provided with an embedded first one-way valve for allowing or blocking air ingress into the water-guiding body and has an air-guiding axis arranged at an acute angle with the longitudinal axis with reference to the first end of the water-guiding body.

14 Claims, 9 Drawing Sheets

VALVE ASSEMBLY FOR USE IN A COOLING APPLIANCE AND COOLING APPLIANCE HAVING THE VALVE ASSEMBLY

CROSS-REFERENCE TO RELATED APPLICATION

This application claims the priority, under 35 U.S.C. § 119, of Turkish Patent Application TR2023/001543, filed Feb. 9, 2023; the prior application is herewith incorporated by reference in its entirety.

FIELD AND BACKGROUND OF THE INVENTION

The present invention relates to a valve assembly according to the preamble of the independent valve assembly claim.

Cooling appliances usually have at least one compartment suitable for keeping food fresh and/or frozen in which the compartment's temperature differs from the outside ambient temperature. These appliances, therefore, include cooling assemblies, i.e. evaporators, configured to regulate the temperature of such compartments. Such cooling assemblies are equipped with drain pipes to remove the condensate build-up and allow defrost water to drain. Since there is a pressure difference between the inner storage space and the outside ambient air, this causes the refrigerator door to be opened only with great effort. Accordingly, the suction force created by the pressure difference between the inner air and the outer air can cause defrost water to move upwards in the drain pipe. Solving this problem requires balancing internal and external pressures.

In the art, vacuum balancing is often established by a one-way valve assembly provided on a drain pipe that is usually placed into the appliance door. Once the door is opened and closed, fresh air transfers to an inner compartment due to the pressure difference. Some of the humidity within the fresh air immediately condenses and leads to frost formation. This accumulation creates several quality problems such as visible frost and disabled vacuum balancing due to clogging. In addition to those problems, door insulation is also reduced due to the presence of valve bodies.

U.S. patent publication No. 2022/049785A1 relates to a valve assembly for controlling waste liquid drainage and providing air balancing in a climatization container. Accordingly, the proposed valve assembly contains a single flow path, i.e. a body portion. The body portion is provided with an air pressure relief valve configured to allow air into the body portion, and a drain valve configured to allow a liquid out of the body portion. The body portion is configured to couple to an exterior wall, e.g. the door, of a climatization container via a connection portion.

SUMMARY OF THE INVENTION

An object of the invention is to provide a valve assembly for use in a cooling appliance, which ensures efficient draining of defrost water while establishing a water-air balance in the cooling appliance without causing frost formation.

The present invention proposes a valve assembly for use in a cooling appliance. The valve assembly contains a water-guiding body for draining water to the outside of the valve assembly. Accordingly, the water-guiding body has a longitudinal axis extending along a first end and a second end of the water-guiding body. The valve assembly further contains at least one air-guiding body coupled to the water-guiding body so as to have a free air inlet end. The air-guiding body is provided with an embedded first one-way valve for allowing or blocking air ingress into the water-guiding body and has an air-guiding axis arranged at an acute angle with the longitudinal axis with reference to the first end of the water-guiding body. Thus, when the first one-way valve is in an open position, the air entering through the air-guiding body reaches the water-guiding body and supports the discharge of the water in the flow direction. Moreover, thanks to the angle arrangement, water is prevented from escaping into the air-guiding body as it flows, and in case it does, the angle provided between the air-guiding axis and the longitudinal axis allows the escaping water to flow back to the water-guiding body. Accordingly, the accumulation of water in the air-guiding body and thus the formation of microorganisms can be avoided.

Here, the acute angle means that the angle is provided with an angle value smaller than 90 degrees.

In a possible embodiment, the second end of the water-guiding body is integrally coupled with a drainage part having a water outlet end. Thus, water can be discharged to an external part via the drainage part.

In a possible embodiment, the drainage part has a drain axis arranged at an obtuse angle with the longitudinal axis with reference to the first end of the water-guiding body. This arrangement ensures that water is drained without accumulating on the inner surface of the water-guiding body or drainage part, thus avoiding microorganism formation. Here, the obtuse angle means that the angle is provided with an angle value greater than 90 degrees.

In a possible embodiment, the drainage part is provided with an embedded second one-way valve for allowing or blocking water removal. This arrangement enables the one-way flow of water through the drainage part when the one-way valve is in an open position. On the other hand, water flow is blocked when the one-way valve is switched to a closed position.

In a possible embodiment, the first one-way valve comprises a first valve body coaxially positioned in the air-guiding body. Thus, the first one-way valve is fully supported by the air-guiding body.

In a possible embodiment, the first one-way valve further comprises a first elastic membrane at least partially covering an inner surface of the first valve body so as to ensure a tight fit of the first valve body into the air-guiding body. This arrangement ensures that the first one-way valve remains fixed and stable in the air-guiding body without slipping.

In a possible embodiment, the first elastic membrane has a contact surface angle with respect to the inner surface of the first valve body so as to provide a constant tension firmly securing the first valve body within the air-guiding body. This ensures that there is no gap between the first elastic membrane and the first valve body so that the first elastic membrane is tense enough to block moist air leakage leading to ice formation in the evaporator area.

In a possible embodiment, the air-guiding body is provided with a first sealing ring configured to be attached to the air inlet end so as to block air leakage between the air-guiding body and the first one-way valve. This arrangement supports the blockage against moist air leakage.

In a possible embodiment, the second one-way valve contains a second valve body coaxially positioned in the drainage part. Thus, the second one-way valve is fully supported by the drainage part.

In a possible embodiment, the second one-way valve further contains a second elastic membrane at least partially covering an inner surface of the second valve body so as to ensure a tight fit of the second valve body into the drainage part. This arrangement ensures that the second one-way valve remains fixed and stable in the drainage part without slipping.

In a possible embodiment, the second elastic membrane has a contact surface angle with respect to the inner surface of the second valve body so as to provide a constant tension firmly securing the second valve body within the drainage part. This ensures that there is no gap between the second elastic membrane and the second valve body so that the second elastic membrane is tense enough to block moist air leakage leading to ice formation in the evaporator area.

In a possible embodiment, the drainage part is provided with a second sealing ring configured to be attached to the water outlet end so as to prevent air leakage between the drainage part and the second one-way valve. This arrangement supports the blockage against moist air leakage as well.

In a possible embodiment, the valve assembly comprises two air-guiding bodies coupled to the water-guiding body. Thus, thanks to the air intake from two separate air-guiding bodies, the water-guiding body can be drained faster and more efficiently. In one embodiment, each of the two air-guiding bodies is aligned at the same level with reference to the longitudinal axis. In another embodiment, each of the two air-guiding bodies is aligned differently with respect to the longitudinal axis.

The present invention also proposes a cooling appliance comprising a valve assembly according to any one of the preceding embodiments. Thus, a cooling appliance having the advantages mentioned above can be achieved.

In a possible embodiment, the cooling appliance comprises two valve assemblies coupled to a cooling assembly having a cooling evaporator. This arrangement ensures that a water-air balance is established in the cooling assembly of the cooling appliance. Accordingly, it simplifies the appliance door opening and eliminates ice formation in the cooling evaporator.

In a possible embodiment, the valve assembly contains two air-guiding bodies. Both air-guiding bodies can protrude may be coupled to the water-guiding body so as to have a free air inlet end, wherein both air-guiding bodies may be provided with an embedded first one-way valve for allowing or blocking air ingress into the water-guiding body and may have an air-guiding axis arranged at an acute angle with the longitudinal axis with reference to the first end of the water-guiding body. Both air-guiding bodies may be identical and merely protrude from the water-guiding body at different positions, i.e. at opposing sides. Two air-guiding bodies increase the capability to exchange air between the surroundings and an interior of the cooling appliance compared to having one air-guiding body. Having two air-guiding bodies at the valve assembly allows in particular to provide a required air exchange while being able to implement a valve assembly being small (compared to a valve assembly having only one air-guiding body being bigger to allow the same amount of air exchange), since they can be positioned at different locations on the water-guiding body.

Other features which are considered as characteristic for the invention are set forth in the appended claims.

Although the invention is illustrated and described herein as embodied in a valve assembly for use in a cooling appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
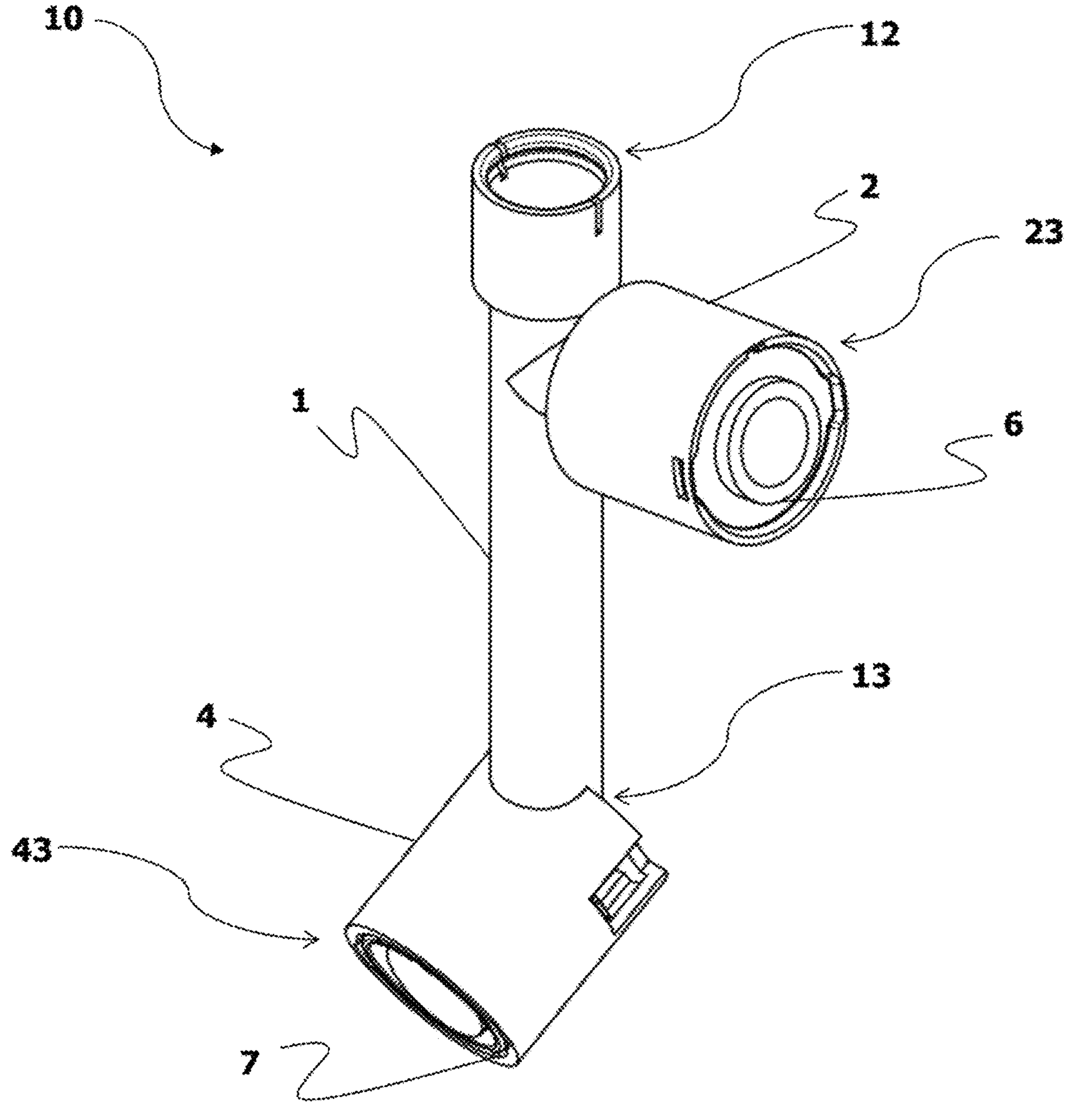
FIG. 1 is a diagrammatic, perspective view of a valve assembly according to the present invention.
Figure 3:
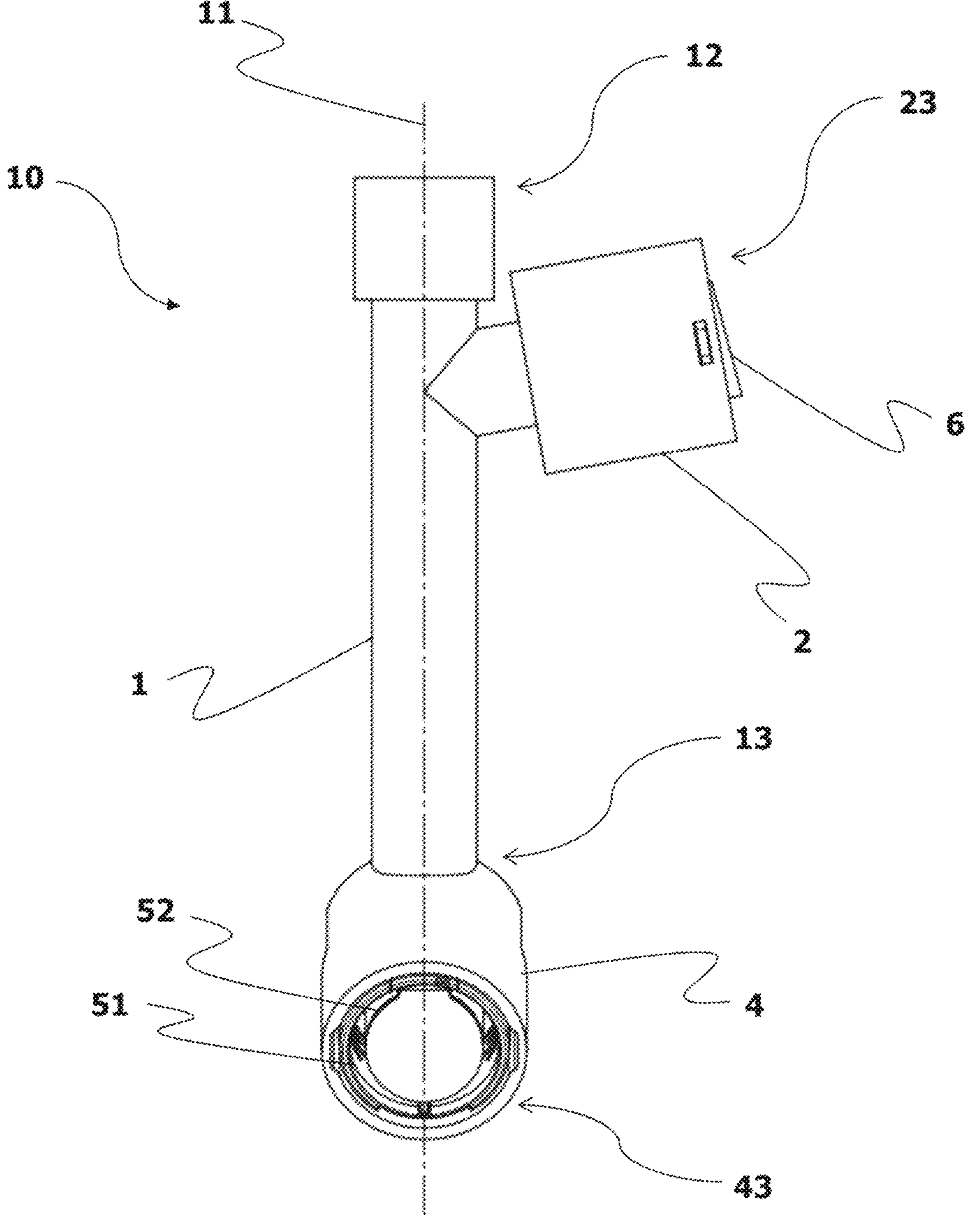
FIG. 3 is a front view of the valve assembly according to the present invention.

Referring now to the figures of the drawings in detail and first, particularly to FIG. 1 thereof, there is shown a valve assembly 10 for use in a cooling appliance 100. Referring to FIG. 1 and FIG. 3, the valve assembly 10 mainly contains two integrated parts, a water-guiding body 1 for use in water draining and an air-guiding body 2 coupled at one end to the water-guiding body 1. The water-guiding body 1 has a substantially tubular form having a first end 12 and a second end 13. The air-guiding body 2 is substantially tubular as well and has at its free end an air inlet end 23 for receiving air from outside the valve assembly 10 and transmitting it into the water-guiding body 1. The valve assembly 10 further contains a tubular drainage part 4 provided at the second end 13 of the water-guiding body 1 for allowing water to drain away via a water outlet end 43.

Figure 4:
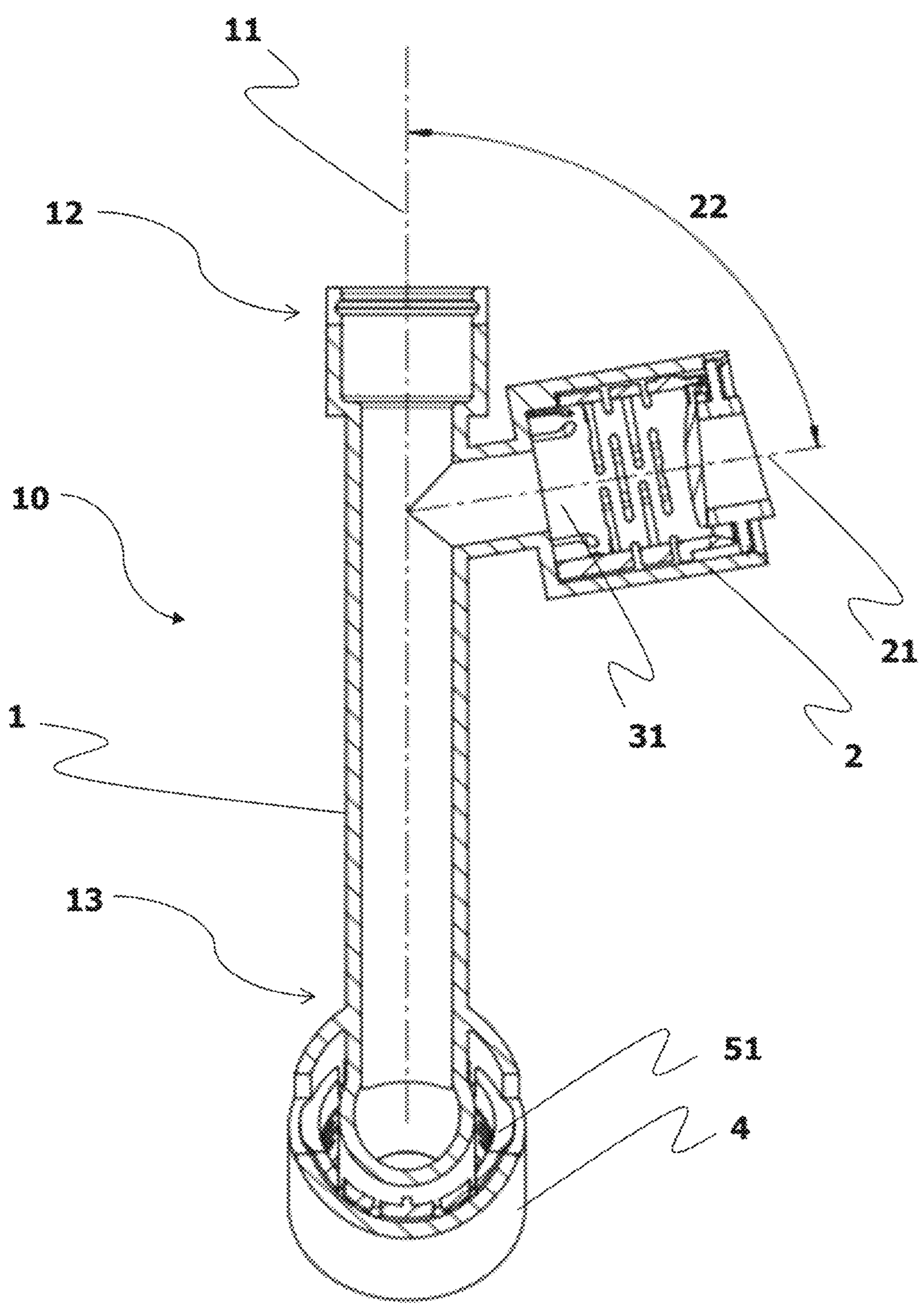
FIG. 4 is a front cross-sectional view of the valve assembly according to the present invention.

The water-guiding body 1 has a longitudinal axis 11 extending along the first end 12 and the second end 13. The air-guiding body 2, on the other hand, has an air-guiding axis 21 that intersects the longitudinal axis 11 at a point. Accordingly, the air-guiding body 2 is coupled with the water-guiding body 1 in such a way that an acute angle 22 is formed between the longitudinal axis 11 and the air-guiding axis 21 with reference to the first end 12 as shown in FIG. 4.

Figure 5:
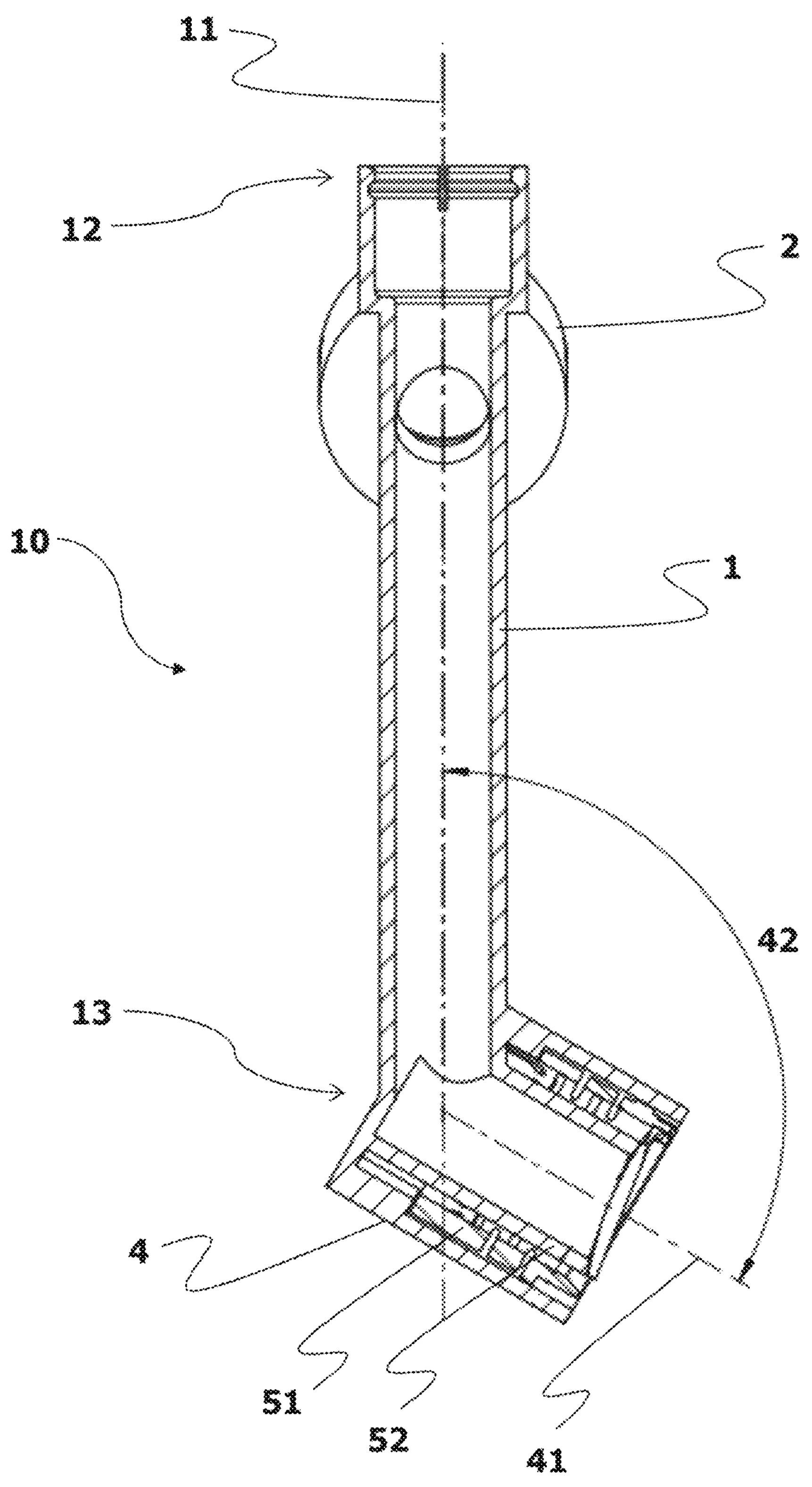
FIG. 5 is a side cross-sectional view of the valve assembly according to the present invention.

Referring to FIG. 5, the drainage part 4 has a drain axis 41 that intersects the longitudinal axis 11. The drain axis 41 is arranged at an obtuse angle 42 with the longitudinal axis 11 with reference to the first end 12 of the water-guiding body 1.

Figure 2:
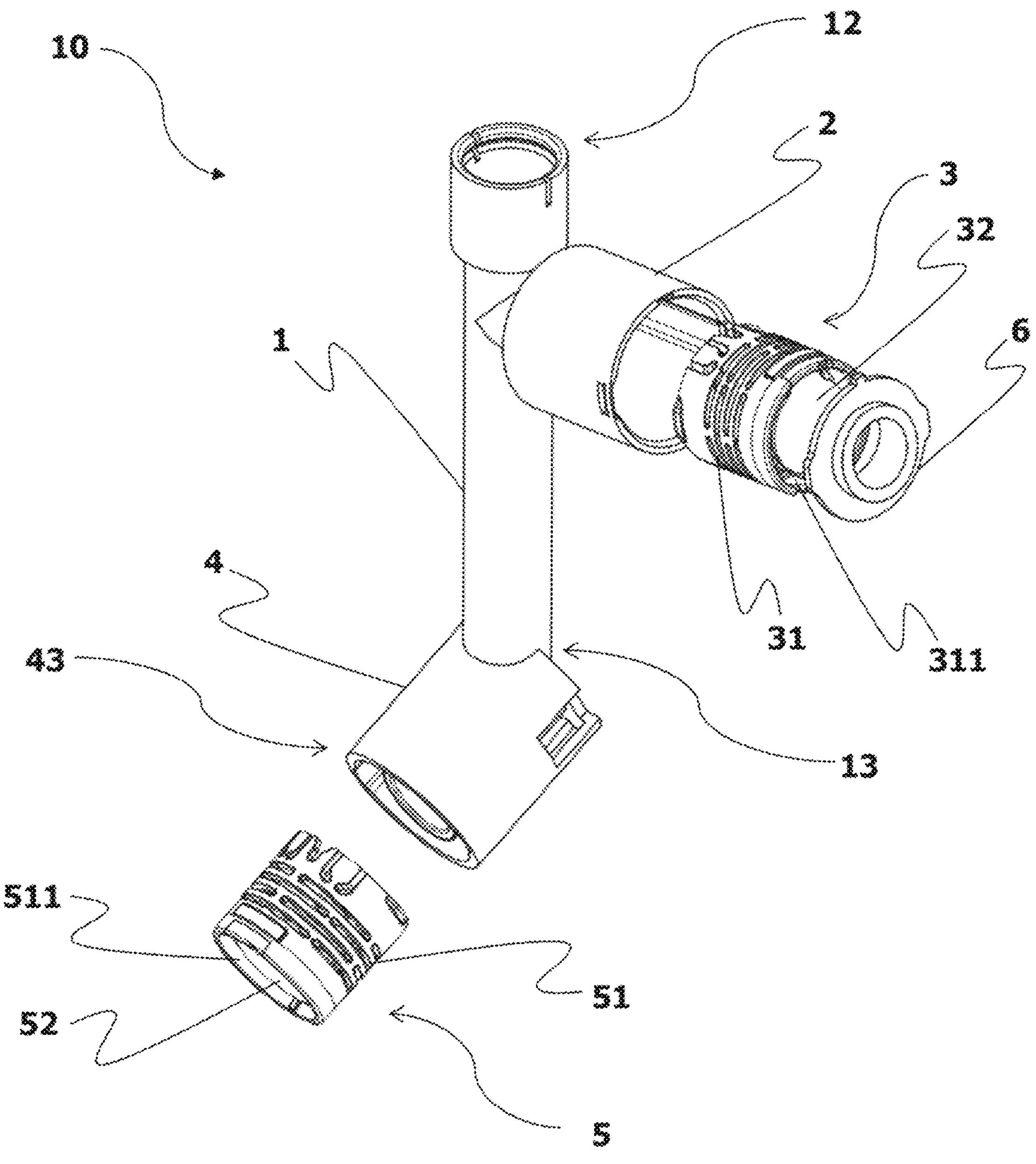
FIG. 2 is an exploded, perspective view of the valve assembly according to the present invention.

The valve assembly 10 further contains two one-way valves, a first one-way valve 3 provided embedded in the air-guiding body 2 and a second one-way valve 5 provided embedded in the drainage part 4 as depicted in FIG. 2. The first one-way valve 3 is configured to allow air ingress into the water-guiding body 1 when in its open position, e.g., during a defrost operation. On the other hand, it is configured to completely block the air ingress when in its closed position, e.g., during normal operation of the cooling appliance 100. The second one-way valve 5 is configured to allow water removal from the water-guiding body 1 when in its open position, e.g., during a defrost operation. On the other hand, it is configured to completely block the water discharge when in its closed position, e.g., during normal operation of the cooling appliance 100.

Figure 6:
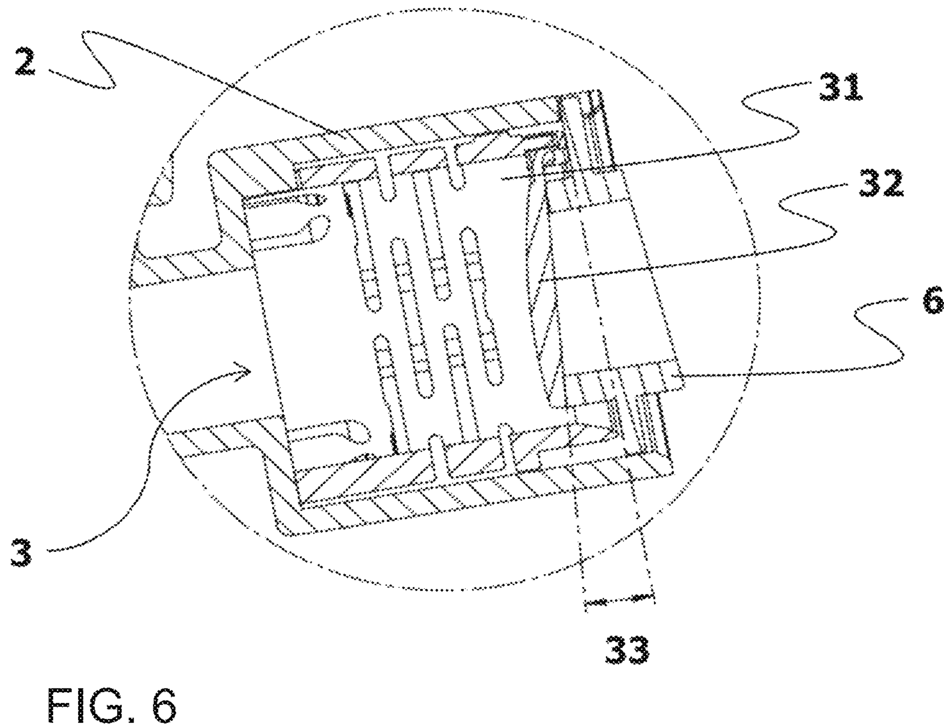
FIG. 6 is a side cross-sectional view of an air-guiding body with a first one-way valve according to the present invention.

Referring to FIG. 2, the first one-way valve 3 contains a first valve body 31 coaxially positioned in the air-guiding body 2 and a first elastic membrane 32 at least partially covering an inner surface 311 of the first valve body 31. The first elastic membrane 32 is flexible so as to pressurize the inner surface 311 of the first valve body 31 so that the first valve body 31 fits tightly into the air-guiding body 2. The first elastic membrane 32 is configured to have a contact surface angle 33 with respect to the inner surface 311 of the first valve body (31 as shown in FIG. 6. This contact surface angle 33 is arranged so that there is no gap between the first elastic membrane 32 and the first valve body 31 and provides an additional compression effect on the first valve body 31.

Figure 7:
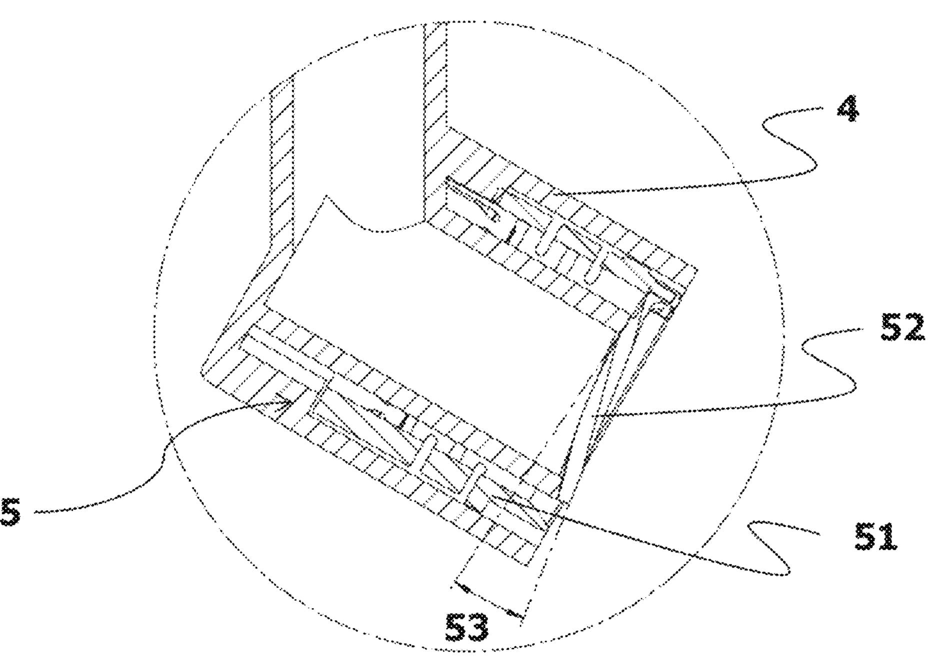
FIG. 7 is a side cross-sectional view of a drainage part with a second one-way valve according to the present invention.

Similar to the first one-way valve 3, the second one-way valve 5 contains a second valve body 51 coaxially positioned in the drainage part 4 and a second elastic membrane 52 at least partially covering an inner surface 511 of the second valve body 51, referring to FIG. 2. The second elastic membrane 52 is flexible so as to pressurize the inner surface 511 of the second valve body 51 so that the second valve body 51 fits tightly into the drainage part 4. The second elastic membrane 52 is fitted onto the inner surface 511 of the second valve body 51 such that it makes a contact surface angle 53 as shown in FIG. 7. This contact surface angle 53 is arranged in a way that no gap is allowed between the second elastic membrane 52 and the second valve body 51 and provides an additional compression effect on the second valve body 51.

The air-guiding body 2 is further provided with a first sealing ring 6 at the air inlet end 23 as shown in FIG. 1 and FIG. 2. The first sealing ring 6 also acts as a fitting connecting the first one-way valve 3 and the air-guiding body 2 while blocking any air leakage from outside into the air-guiding body 2 or from the air-guiding body 2 to outside.

The drainage part 4 is provided with a second sealing ring 7 referring to FIG. 1. The second sealing ring 7 is fitted on the water outlet end 43 of the drainage part 4 so as to provide watertightness when the second one-way valve 5 is in its closed position.

Figure 8:
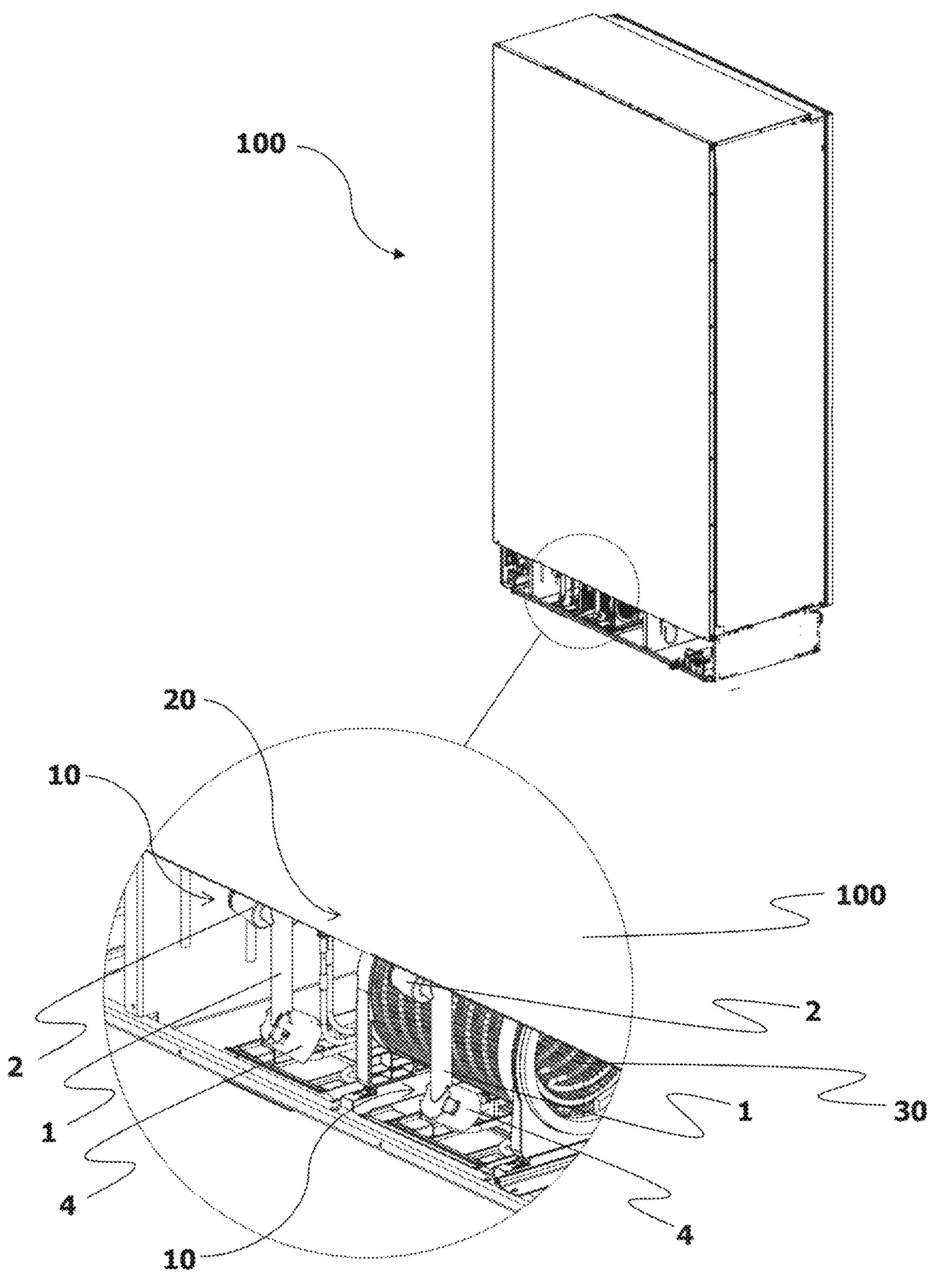
FIG. 8 is a rear perspective view and a detailed view of a cooling appliance containing two valve assemblies according to the present invention, in which the valve assemblies are coupled to a cooling assembly having a cooling evaporator.

A valve assembly 10, as shown in FIG. 8., containing two air-guiding bodies 2 coupled to one single water-guiding body 1 is also proposed within the scope of the invention. Each of these two air-guiding bodies 2 has a free air inlet end 23 and has an air-guiding axis 21 arranged at an acute angle 22 with the longitudinal axis 11 with reference to the first end 12 of the water-guiding body 1. Furthermore, each is provided with an embedded first one-way valve 3 for allowing or blocking air ingress into the water-guiding body 1.

Figure 9:
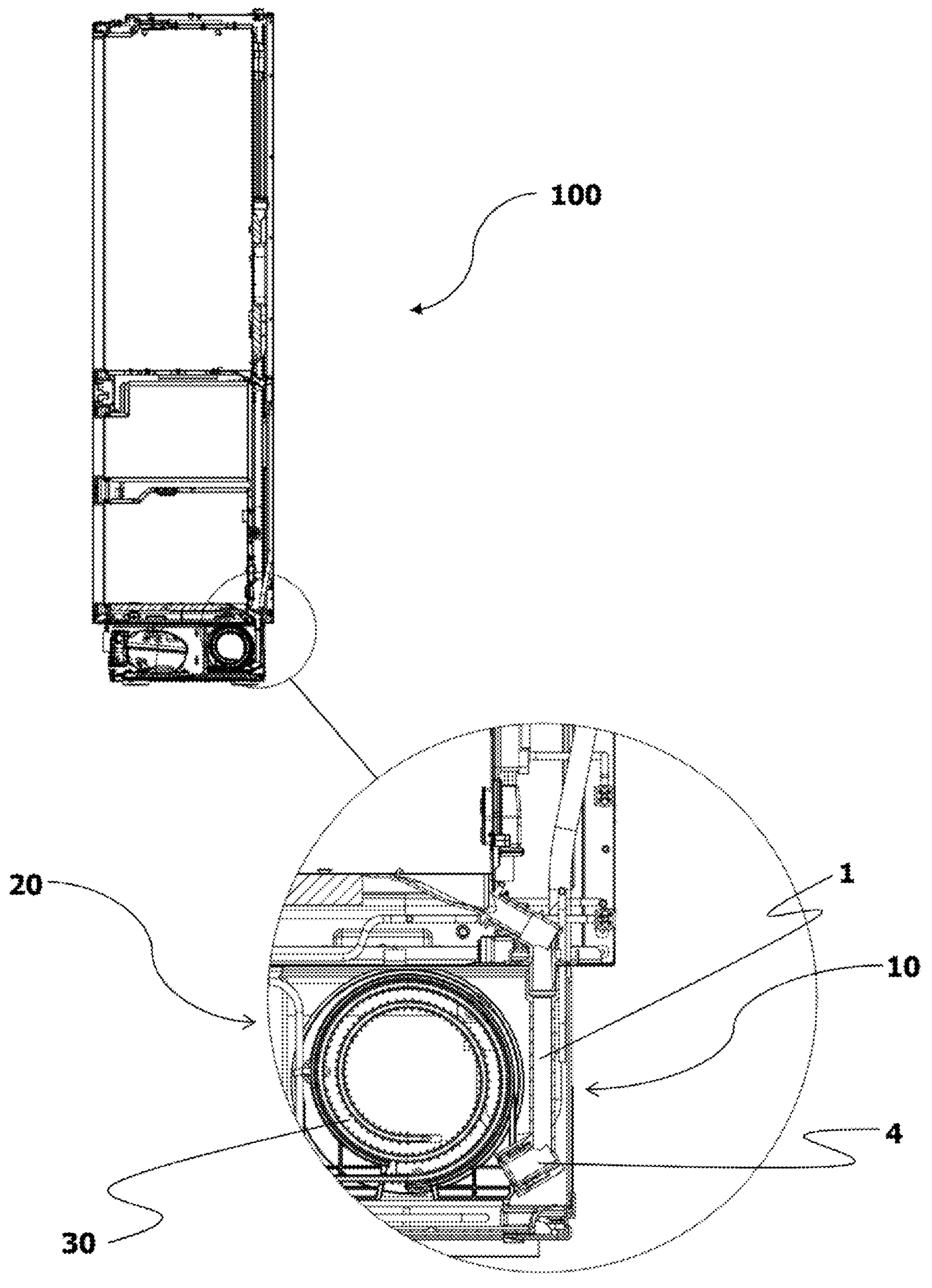
FIG. 9 is a side cross-sectional view and a detailed cross-sectional view of the cooling appliance containing the valve assembly according to the present invention, in which the valve assembly is coupled to a cooling assembly having a cooling evaporator.

The present invention further proposes a cooling appliance 100, as depicted in FIG. 9, containing a valve assembly 10 according to the invention. Accordingly, the cooling appliance 100 further contains a cooling assembly 20 having a cooling evaporator 30, in which the valve assembly 10 is functionally coupled to the cooling assembly 20.

Referring to FIG. 9, the present invention further proposes a cooling appliance 100 containing two valve assemblies 10 according to the invention, in which both valve assemblies are functionally coupled to a cooling assembly 20 having a cooling evaporator 30.

Referring to FIG. 9, during a defrost operation of the cooling appliance 100, defrost water coming from the cooling assembly 20 is received by the water-guiding body 1 and removed through the drainage part 4 by means of the air pushing effect provided by the air-guiding body 2.

Figure 10:
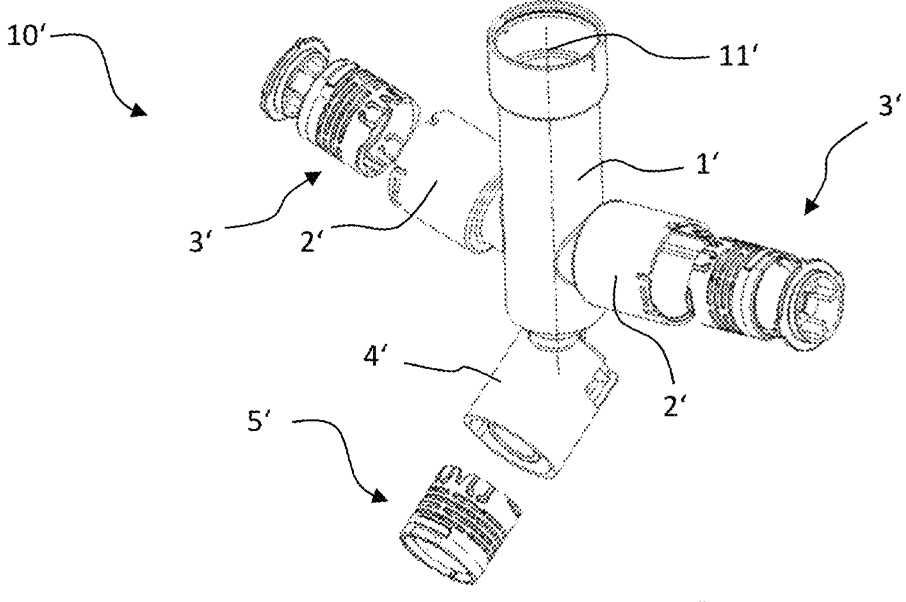
FIG. 10 is an exploded, perspective view of the valve assembly according to a different embodiment of the present invention (comparable view as FIG. 2)
Figure 11:
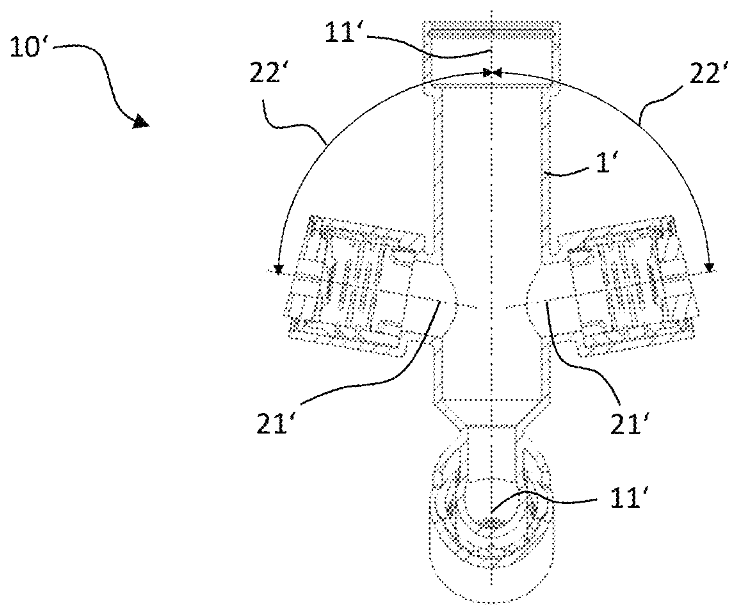
FIG. 11 is a front cross-sectional view of a valve assembly according to a different embodiment of the present invention (comparable view as FIG. 4).

Referring to FIGS. 10 and 11 a different embodiment of the present invention is depicted. Same elements are depicted with the same reference number, whereas only a '-sign has been added.

The difference to the valve assembly 10 as described in FIGS. 1 to 9 is that the valve assembly 10' shown in FIGS. 10 and 11 comprises two air-guiding bodies 2'. These protrude from the water-guiding body 1' in two different, namely opposing, directions at the same height along the longitudinal axis 11'. Each air-guiding body 2' comprises a first one-way valve 3'.

An air-guiding axis 21' of both air-guiding bodies 2' has an acute angle 22' with respect to the longitudinal axis 11' of the water-guiding body 1'.

The following is a summary list of reference numerals and the corresponding structure used in the above description of the invention.

REFERENCE LIST

100. Cooling appliance
10. Valve assembly
20. Cooling assembly
30. Cooling evaporator
1. Water-guiding body
11. Longitudinal axis
12. First end
13. Second end
2. Air-guiding body
21. Air-guiding axis
22. Acute angle
23. Air inlet end
3. First one-way valve
31. First valve body
311. Inner surface
32. First elastic membrane
33. Contact surface angle
4. Drainage part
41. Drain axis
42. Obtuse angle
43. Water outlet end
5. Second one-way valve
51. Second valve body
511. Inner surface
52. Second elastic membrane

53. Contact surface angle
6. First sealing ring
7. Second sealing ring

The invention claimed is:

1. A valve assembly for use in a cooling appliance, the valve assembly comprising:

a water-guiding body for draining water to an outside of the valve assembly, wherein said water-guiding body has a longitudinal axis extending between a first end and a second end of said water-guiding body;

at least one air-guiding body coupled to said water-guiding body and having a free air inlet end, wherein said at least one air-guiding body has an embedded first one-way valve for allowing or blocking air ingress into said water-guiding body and an air-guiding axis disposed at an acute angle with the longitudinal axis with reference to said first end of said water-guiding body; and a drainage part having a water outlet end, wherein said second end of said water-guiding body is integrally coupled with said drainage part, wherein said drainage part has a drain axis disposed at an obtuse angle with the longitudinal axis with reference to said first end of said water-quiding body.

2. A cooling appliance, comprising:

said valve assembly according to claim 1.

3. The cooling appliance according to claim 2, further comprising a cooling assembly having a cooling evaporator; and wherein said valve assembly is one of two valve assemblies coupled to said cooling assembly.

4. A valve assembly for use in a cooling appliance, the valve assembly comprising:

a water-guiding body for draining water to an outside of the valve assembly, wherein said water-guiding body has a longitudinal axis extending between a first end and a second end of said water-guiding body; and at least one air-guiding body coupled to said water-guiding body and having a free air inlet end, wherein said at least one air-guiding body has an embedded first one-way valve for allowing or blocking air ingress into said water-guiding body and an air-guiding axis disposed at an acute angle with the longitudinal axis with reference to said first end of said water-guiding body, wherein said first one-way valve has a first valve body coaxially positioned in said at least one air-guiding body, wherein said first one-way valve further has a first elastic membrane at least partially covering an inner surface of said first valve body so as to ensure a tight fit of said first valve body into said at least one air-guiding body.

5. The valve assembly according to claim 4, further comprising a drainage part having a water outlet end, wherein said second end of said water-guiding body is integrally coupled with said drainage part.

6. The valve assembly according to claim 5, wherein said drainage part has an embedded second one-way valve for allowing or blocking water removal.

7. The valve assembly according to claim 6, wherein said second one-way valve contains a second valve body coaxially positioned in said drainage part.

8. The valve assembly according to claim 7, wherein said second one-way valve further includes a second elastic membrane at least partially covering an inner surface of said second valve body so as to ensure a tight fit of said second valve body into said drainage part.

9. The valve assembly according to claim 8, wherein said second elastic membrane has a contact surface angle with respect to said inner surface of said second valve body so as to provide a constant tension firmly securing said second valve body within said drainage part.

10. The valve assembly according to claim 8, wherein said drainage part has a second sealing ring configured to be attached to said water outlet end so as to prevent air leakage between said drainage part and said second one-way valve.

11. The valve assembly according to claim 4, wherein said drainage part has a drain axis disposed at an obtuse angle with the longitudinal axis with reference to said first end of said water-guiding body.

12. The valve assembly according to claim 4, wherein said first elastic membrane has a contact surface angle with respect to said inner surface of said first valve body so as to provide a constant tension firmly securing said first valve body within said at least one air-guiding body.

13. The valve assembly according to claim 4, wherein said at least one air-guiding body has a first sealing ring configured to be attached to said free air inlet end so as to block air leakage between said at least one air-guiding body and said first one-way valve.

14. A valve assembly for use in a cooling appliance, the valve assembly comprising:

a water-guiding body for draining water to an outside of the valve assembly, wherein said water-guiding body has a longitudinal axis extending between a first end and a second end of said water-guiding body; and two air-guiding bodies coupled to said water-guiding body and having a free air inlet end, wherein one of the two air-guiding bodies has an embedded first one-way valve for allowing or blocking air ingress into said water-guiding body and an air-guiding axis disposed at an acute angle with the longitudinal axis with reference to said first end of said water-guiding body.

* * * * *